E. J. F. QUIRIN.
MACHINE FOR SETTING OUT AND UNHAIRING CALF AND GOAT SKINS.
APPLICATION FILED NOV. 4, 1921.

1,438,059.

Patented Dec. 5, 1922.

E. J. F. QUIRIN.
MACHINE FOR SETTING OUT AND UNHAIRING CALF AND GOAT SKINS.
APPLICATION FILED NOV. 4, 1921.

1,438,059.

Patented Dec. 5, 1922.

Inventor
E. J. F. Quirin
By E. W. Anderson Jr.
Attorney

E. J. F. QUIRIN.
MACHINE FOR SETTING OUT AND UNHAIRING CALF AND GOAT SKINS.
APPLICATION FILED NOV. 4, 1921.
1,438,059.
Patented Dec. 5, 1922.
3 SHEETS—SHEET 3.
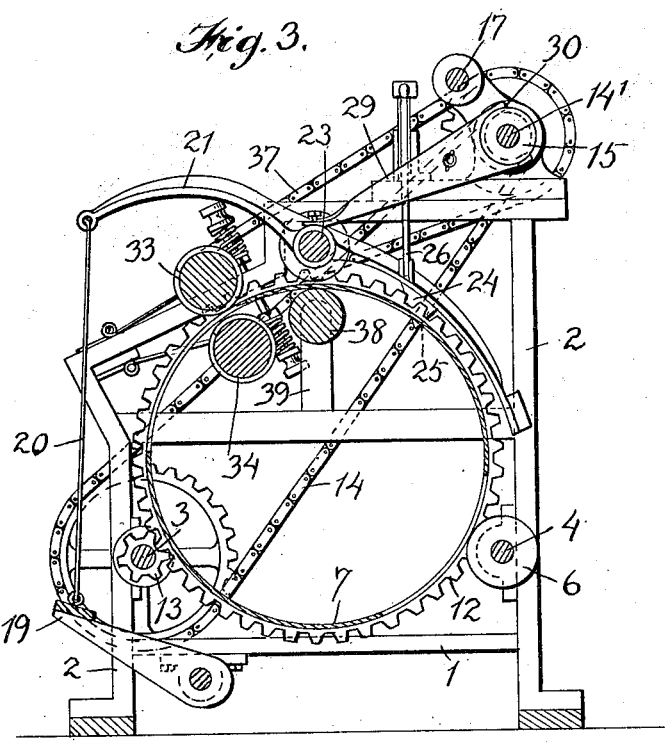
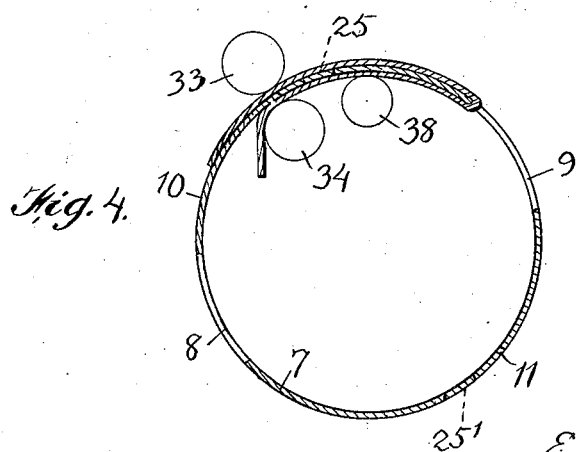

Patented Dec. 5, 1922.

1,438,059

UNITED STATES PATENT OFFICE.

EMILE J. F. QUIRIN, OF TIOGA CENTER, NEW YORK.

MACHINE FOR SETTING OUT AND UNHAIRING CALF AND GOAT SKINS.

Application filed November 4, 1921. Serial No. 512,824.

*To all whom it may concern:*

Be it known that I, EMILE J. F. QUIRIN, a citizen of the United States, resident of Tioga Center, in the county of Tioga and State of New York, have made a certain new and useful Invention in Machines for Setting Out and Unhairing Calf and Goat Skins; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 3 is a section on the line 3—3 Figure 1.

Figure 4 is a transverse sectional view partly diagrammatic of the cylinder, the cutter rolls, and the hold up roll.

Figure 1:
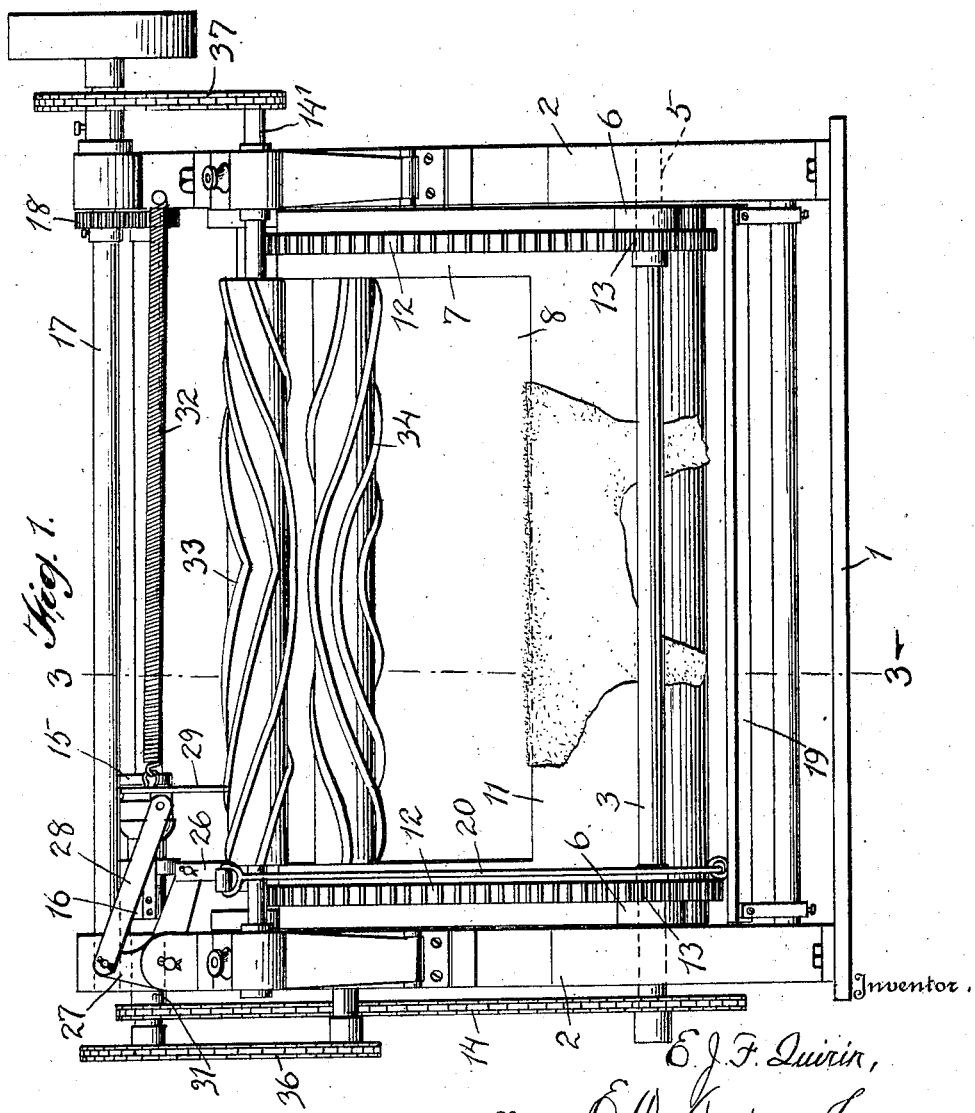
Figure 1 is a front view of the invention.
Figure 2:
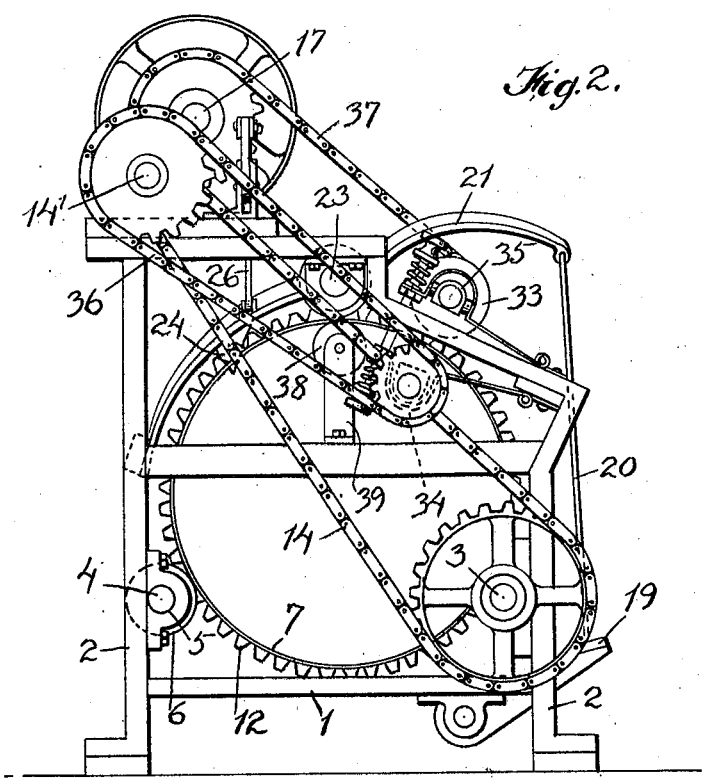
Figure 2 is an end view of the same.
Figure 5:
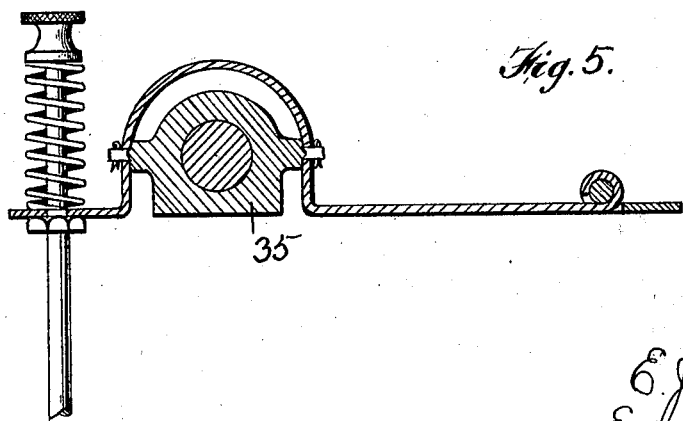
Figure 5 is a detail sectional view of one of the yieldable bearings for the work rolls.

The invention has relation to machines for setting out and unhairing calf and goat skins, having for an object to provide a machine adapted to work the leather upon both sides with one operation. Other objects and advantages will appear.

The invention consists in the novel construction and combinations of parts, as hereinafter set forth.

In the accompanying drawings illustrating an embodiment of the invention, the numeral 1 designates the machine frame, having end standards 2, 2, and forward and rear shafts 3 and 4 having bearings at 5 in the end standards, said shafts carrying rollers 6 whereon rests the cylinder 7, which is hollow and the internal and external circumferential surfaces of which are of true cylindrical form. The cylinder is provided with circumferential openings 8 and 9 diametrically opposite each other and thereby providing diametrically opposite work-supporting part cylindrical sections 10 and 11. The annular end portions of the cylinder are supported by and rotate upon the rollers 6.

The cylinder is provided at each end thereof with annular gear teeth 12, whereby it is rotated, through engagement therewith of pinions 13, the latter being carried by the aforesaid shaft 3, said shaft having sprocket gearing connection 14 with an upper rear shaft 14', having bearings in the end standards, and provided with fast and loose members 15 and 16 of a clutch. The power shaft 17 is located just above the shaft 14' and has gear connection 18 therewith.

A treadle 19 has an operating rod connection 20 with a lever 21, mounted upon a shaft 23, having bearings in the end standards, and said lever is provided at the free end of its rear or power arm with a lug 24, normally engaging a circumferential slot 25 located about midway between the opposite circumferential openings of the cylinder. The rear arm of said lever is also provided with an operating rod or link connection 26, with a bell lever 27 fulcrumed upon one of the end frames and having an operating rod connection 28, with a clutch operating lever 29, fulcrumed at one end upon the rod or shaft 23, and at its opposite end having an operating connection at 30 with the slidable fast member 15 of the clutch.

Upon depression of the treadle, the lever 21 will be operated and the lug 24 will be lifted from engagement with the circumferential slot of the cylinder, and simultaneously the fast member of the clutch will be slid into engagement with the loose member thereof, which latter is fast upon a sleeve 31, whereon is also fast the upper sprocket wheel of the sprocket gearing 14. In this way, the depression of the treadle will release the cylinder which will be rotated one half around or 180 degrees until the lug 24 arrives opposite the circumferential slot 25' of the cylinder which is diametrically opposite the slot 25, when the lug 24 which has hitherto been held against the circumferential surface of the cylinder will be forced into or drop into the notch or slot 25' automatically to thereby again lock the cylinder against rotation and at the same time through reverse operation of the lever 21, the clutch will be released and the sprocket gearing will no longer operate to rotate the cylinder.

The automatic operation of the lever 21 to lock the cylinder at the end of a 180 degrees rotation thereof is accomplished by means of the coiled spring 32, which is placed under tension when said lever is operated to effect the clutch, and is held under tension during the time the lug 24 is riding around upon the cylinder and is enabled to act again as stated as soon as the lug again falls into its notch or slot.

The rotation of the cylinder 180° as stated will pass the leather between the two work rolls 33 and 34, which are provided with spiral cutter blades as is common and which work out the wrinkles in the leather. The skin or leather is placed upon one of the work supporting sections 10 or 11, within the circumferential opening 8 or 9, and doubled over the edge of said section, one half in, as shown. One of these work rolls 33, being the outer roll, rotates in proximity to the outer skin half resting upon the cylinder, and the other 34, is located within the cylinder and operates in proximity to the inner half of the skin, which is thereby pressed against the inner circumferential surface of the cylinder. These work rolls are mounted in yieldable bearings 35, and accommodate themselves to skins of varying thicknesses and to an accidentally doubled or folded piece of leather. Sprocket gearing 36 and 37 is for the purpose of rotating these work rolls.

In order to keep the leather up against the inner circumferential surface of the cylinder, a roller 38 is provided, being also located within the cylinder, and having bearings in extensions 39 of the end standards.

The machine is normally located with the cylinder in position so that the operator at front of machine can place a piece of leather in the cylinder, and upon a half rotation and stoppage of the cylinder as stated, the operator at the rear of the machine can then remove the leather, the cylinder being at the same time in position for the operator at front thereof to place another piece of leather in the machine.

Owing to the cylinder being mounted to rotate upon external roller bearings and being without a center shaft or support, it is made possible to provide a work roller upon the inside of the cylinder, as well as a hold-up roller for the leather, the result being that the working of the leather upon both sides is accomplished with one operation.

This is of obvious advantage in saving time, and in saving of wear and tear upon the machine.

I claim:—

1. In a machine for setting out and unhairing skins, the combination of a hollow work-supporting cylinder, having outer and inner cylindrical surfaces, a longitudinal cutter roll operating in proximity to the outer surface of the cylinder, and a longitudinal cutter roll located within said cylinder and operating in proximity to the inner surface thereof.

2. In a machine for setting out and unhairing skins, a hollow work-supporting cylinder having outer and inner cylindrical surfaces and adapted for the placing of a skin thereon with one half of the doubled skin upon the outer surface of the cylinder and the other half upon the inner surface of the cylinder, an outer longitudinal cutter roll operating in proximity to the outer surface of the cylinder and upon the outer half of the skin, and a longitudinal cutter roll located within the cylinder and operating in proximity to the inner surface of the cylinder and upon the inner half of the skin.

3. In a machine for setting out and unhairing skins, a hollow work-supporting cylinder having outer and inner cylindrical surfaces and adapted for the placing of a skin thereon with one half of the doubled skin upon the outer surface of the cylinder and the other half upon the inner surface of the cylinder, means for rotating the cylinder intermittently to a predetermined degree, an outer longitudinal cutter roll operating in proximity to the outer surface of the cylinder and a longitudinal cutter roll located within the cylinder and operating in proximity to the inner surface thereof.

4. In a machine for setting out and unhairing skins, a hollow work supporting cylinder having outer and inner cylindrical surfaces and adapted for the placing of a skin thereon with one half of the doubled skin upon the outer surface of the cylinder and the other half upon the inner surface thereof, of an outer longitudinal cutter roll adapted to operate in proximity to the outer surface of the cylinder upon the outer half of the skin, and a longitudinal cutter roll located within the cylinder and adapted to operate in proximity to the inner surface of the cylinder upon the inner half of the skin, and a hold-up roller for the inner half of the skin and also located within the cylinder.

5. In a machine for setting out and unhairing skins, a hollow work-supporting cylinder having outer and inner cylindrical surfaces adapted for the placing of a skin thereon with one half of the doubled skin upon the outer side of the cylinder and the other half upon the inner surface thereof, external supporting roller bearings for the cylinder, a longitudinal cutter roll adapted to work upon the outer half of the skin, a longitudinal cutter roll adapted to work upon the inner half of the skin and located within the cylinder, and a hold-up roller for the inner half of the skin and also located within the cylinder.

6. In a machine for setting out and unhairing skins, a hollow work supporting cylinder having diametrically opposite openings and diametrically opposite sections, each section having outer and inner cylindrical surfaces and being adapted respectively for the placing of a doubled skin thereon with one half located upon the outer surface of the respective section and the other half upon the inner surface side thereof, means for rotating said cylinder intermittently for 180°, an outer cutter roll adapted to work upon the outer half of the skin, and an inner cutter roll located within the cylinder and adapted to work upon the inner half of the skin.

7. In a machine for setting out and unhairing skins, a hollow work supporting cylinder having diametrically opposite longitudinal openings and diametrically opposite sections, each section having outer and inner cylindrical surfaces and being adapted for the placing of a skin thereon with one half of the doubled skin upon the outer surface of said section and the outer half upon inner surface thereof, said cylinder having diametrically opposite slots, a stop lever engaging one of said slots to hold said cylinder stationary, a power shaft having a clutch device, a treadle adapted to operate said stop lever to release said cylinder and to effect the clutch of said device, the latter having an operating connection with said cylinder adapted to rotate the same, said stop lever being adapted to ride upon the outer surface of the cylinder and to automatically engage the diametrically opposite of said slots upon rotation of the cylinder for 180 degrees to thereby stop the cylinder and to release said clutch.

In testimony whereof I affix my signature in presence of two witnesses.

EMILE J. F. QUIRIN.

Witnesses:
GEORGE B. MURZ,
ALFRED J. BROOKS.